(12) United States Patent
Lee et al.

(10) Patent No.: US 9,598,018 B2
(45) Date of Patent: Mar. 21, 2017

(54) DISPLAY MIRROR ASSEMBLY

(71) Applicant: Gentex Corporation, Zeeland, MI (US)

(72) Inventors: Ethan J. Lee, Byron Center, MI (US); John A. VanderPloeg, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 127 days.

(21) Appl. No.: 14/202,456

(22) Filed: Mar. 10, 2014

(65) Prior Publication Data
US 2014/0268355 A1    Sep. 18, 2014

Related U.S. Application Data

(60) Provisional application No. 61/788,815, filed on Mar. 15, 2013.

(51) Int. Cl.
| | |
|---|---|
| G02B 27/14 | (2006.01) |
| G02F 1/03 | (2006.01) |
| G02F 1/15 | (2006.01) |
| G09G 3/19 | (2006.01) |
| B60R 1/12 | (2006.01) |
| B60R 1/04 | (2006.01) |

(52) U.S. Cl.
CPC .............. *B60R 1/12* (2013.01); *B60R 1/04* (2013.01); *B60R 2001/1215* (2013.01); *B60R 2001/1253* (2013.01)

(58) Field of Classification Search
CPC ...... G02F 1/155; G02F 1/1523; G02F 1/1525; G02F 1/1521; G02F 1/163; G02F 1/1533; G02F 1/03; G02F 1/0316; G02F 3/16; C09K 9/02; B60R 1/088; H04N 9/3137; H04N 9/22

USPC ........ 359/265–275, 277, 245–247, 254, 242; 349/49, 105, 107; 250/70; 248/817; 438/929

See application file for complete search history.

(56) References Cited

U.S. PATENT DOCUMENTS

| | | | |
|---|---|---|---|
| 4,109,235 | A | 8/1978 | Bouthors |
| 4,214,266 | A | 7/1980 | Myers |
| 4,257,703 | A | 3/1981 | Goodrich |
| 4,277,804 | A | 7/1981 | Robison |

(Continued)

FOREIGN PATENT DOCUMENTS

| | | |
|---|---|---|
| JP | 2005148119 | 6/2005 |
| JP | 2005327600 | 11/2005 |
| KR | 200545816 | 5/2005 |

OTHER PUBLICATIONS

Patent Cooperation Treaty, International Searching Authority, International Search Report, Written Opinion of the International Searching Authority and Notification of Transmittal, Aug. 7, 2014, 7 Pages.

*Primary Examiner* — Dawayne A Pinkney
(74) *Attorney, Agent, or Firm* — Price Heneveld LLP; Bradley D. Johnson (57) ABSTRACT

A display mirror assembly for a vehicle includes a partially reflective, partially transmissive element; and a full display module mounted behind the partially reflective, partially transmissive element, the display module having an optic block, and a display in optical communication with the optic block, the display being one an in-place switching liquid crystal display, a fringe filed switching liquid crystal display, and a vertically aligned liquid crystal display.

17 Claims, 7 Drawing Sheets

(56) References Cited

U.S. PATENT DOCUMENTS

| | | |
|---|---|---|
| 4,310,851 A | 1/1982 | Pierrat |
| 4,361,384 A * | 11/1982 | Bosserman ........ G02B 27/0172 |
| | | 359/618 |
| 4,638,287 A | 1/1987 | Umebayashi et al. |
| 4,665,430 A | 5/1987 | Hiroyasu |
| 4,692,798 A | 9/1987 | Seko et al. |
| 4,740,838 A | 4/1988 | Mase et al. |
| 4,910,591 A | 3/1990 | Petrossian et al. |
| 5,005,213 A | 4/1991 | Hanson et al. |
| 5,027,200 A | 6/1991 | Petrossian et al. |
| 5,121,200 A | 6/1992 | Choi et al. |
| 5,197,562 A | 3/1993 | Kakinami et al. |
| 5,230,400 A | 7/1993 | Kakinami et al. |
| 5,243,417 A | 9/1993 | Pollard |
| 5,285,060 A | 2/1994 | Larson et al. |
| 5,289,321 A | 2/1994 | Secor |
| 5,296,924 A | 3/1994 | Blancard et al. |
| 5,304,980 A | 4/1994 | Maekawa |
| 5,386,285 A | 1/1995 | Asayama |
| 5,408,357 A | 4/1995 | Beukema |
| 5,414,461 A | 5/1995 | Kishi et al. |
| 5,418,610 A | 5/1995 | Fischer |
| 5,424,952 A | 6/1995 | Asayama |
| 5,469,298 A | 11/1995 | Suman et al. |
| 5,475,494 A | 12/1995 | Nishida et al. |
| 5,483,453 A | 1/1996 | Uemura et al. |
| 5,485,378 A | 1/1996 | Franke et al. |
| 5,488,496 A | 1/1996 | Pine |
| 5,515,448 A | 5/1996 | Nishitani |
| 5,523,811 A | 6/1996 | Wada et al. |
| 5,530,421 A | 6/1996 | Marshall et al. |
| 5,535,144 A | 7/1996 | Kise |
| 5,541,590 A | 7/1996 | Nishio |
| 5,574,443 A | 11/1996 | Hsieh |
| 5,576,975 A | 11/1996 | Sasaki et al. |
| 5,602,542 A | 2/1997 | Widmann et al. |
| 5,615,023 A | 3/1997 | Yang |
| 5,617,085 A | 4/1997 | Tsutsumi et al. |
| 5,634,709 A | 6/1997 | Iwama |
| 5,642,238 A | 6/1997 | Sala |
| 5,646,614 A | 7/1997 | Abersfelder et al. |
| 5,650,765 A | 7/1997 | Park |
| 5,670,935 A | 9/1997 | Schofield et al. |
| 5,680,123 A | 10/1997 | Lee |
| 5,708,410 A | 1/1998 | Blank et al. |
| 5,708,857 A | 1/1998 | Ishibashi |
| 5,729,194 A | 3/1998 | Spears et al. |
| 5,745,050 A | 4/1998 | Nakagawa |
| 5,751,211 A | 5/1998 | Shirai et al. |
| 5,754,099 A | 5/1998 | Nishimura et al. |
| 5,760,828 A | 6/1998 | Cortes |
| 5,764,139 A | 6/1998 | Nojima et al. |
| 5,767,793 A | 6/1998 | Agravante et al. |
| 5,793,308 A | 8/1998 | Rosinski et al. |
| 5,793,420 A | 8/1998 | Schmidt |
| 5,844,505 A | 12/1998 | Van Ryzin |
| 5,850,176 A | 12/1998 | Kinoshita et al. |
| 5,883,739 A | 3/1999 | Ashihara et al. |
| 5,904,729 A | 5/1999 | Ruzicka |
| 5,940,011 A | 8/1999 | Agravante et al. |
| 5,949,331 A | 9/1999 | Schofield et al. |
| 5,956,079 A | 9/1999 | Ridgley |
| 5,956,181 A | 9/1999 | Lin |
| 5,959,555 A | 9/1999 | Furuta |
| 6,009,359 A | 12/1999 | El-Hakim et al. |
| 6,025,872 A | 2/2000 | Ozaki et al. |
| 6,046,766 A | 4/2000 | Sakata |
| 6,060,989 A | 5/2000 | Gehlot |
| 6,061,002 A | 5/2000 | Weber et al. |
| 6,067,111 A | 5/2000 | Hahn et al. |
| 6,072,391 A | 6/2000 | Suzuki et al. |
| 6,078,355 A | 6/2000 | Zengel |
| 6,106,121 A | 8/2000 | Buckley et al. |
| 6,111,498 A | 8/2000 | Jobes et al. |
| 6,115,651 A | 9/2000 | Cruz |
| 6,122,597 A | 9/2000 | Saneyoshi et al. |
| 6,128,576 A | 10/2000 | Nishimoto et al. |
| 6,151,065 A | 11/2000 | Steed et al. |
| 6,151,539 A | 11/2000 | Bergholz et al. |
| 6,154,149 A | 11/2000 | Tychkowski et al. |
| 6,157,294 A | 12/2000 | Urai et al. |
| 6,166,628 A | 12/2000 | Andreas |
| 6,167,755 B1 | 1/2001 | Damson et al. |
| 6,172,600 B1 | 1/2001 | Kakinami et al. |
| 6,172,601 B1 | 1/2001 | Wada et al. |
| 6,175,300 B1 | 1/2001 | Kendrick |
| 6,184,781 B1 | 2/2001 | Ramakesavan |
| 6,185,492 B1 | 2/2001 | Kagawa et al. |
| 6,191,704 B1 | 2/2001 | Takenaga et al. |
| 6,200,010 B1 | 3/2001 | Anders |
| 6,218,934 B1 | 4/2001 | Regan |
| 6,222,447 B1 | 4/2001 | Schofield et al. |
| 6,249,214 B1 | 6/2001 | Kashiwazaki |
| 6,250,766 B1 | 6/2001 | Strumolo et al. |
| 6,259,475 B1 | 7/2001 | Ramachadran et al. |
| 6,265,968 B1 | 7/2001 | Betzitza et al. |
| 6,268,803 B1 | 7/2001 | Gunderson et al. |
| 6,269,308 B1 | 7/2001 | Kodaka et al. |
| 6,281,804 B1 | 8/2001 | Haller et al. |
| 6,289,332 B2 | 9/2001 | Menig et al. |
| 6,300,879 B1 | 10/2001 | Regan et al. |
| 6,304,173 B2 | 10/2001 | Pala et al. |
| 6,317,057 B1 | 11/2001 | Lee |
| 6,320,612 B1 | 11/2001 | Young |
| 6,324,295 B1 | 11/2001 | Valery et al. |
| 6,330,511 B2 | 12/2001 | Ogura et al. |
| 6,335,680 B1 | 1/2002 | Matsuoka |
| 6,344,805 B1 | 2/2002 | Yasui et al. |
| 6,348,858 B2 | 2/2002 | Weis et al. |
| 6,356,206 B1 | 3/2002 | Takenaga et al. |
| 6,357,883 B1 | 3/2002 | Strumolo et al. |
| 6,363,326 B1 | 3/2002 | Scully |
| 6,396,397 B1 | 5/2002 | Bos et al. |
| 6,408,247 B1 | 6/2002 | Ichikawa et al. |
| 6,412,959 B1 | 7/2002 | Tseng |
| 6,415,230 B1 | 7/2002 | Maruko et al. |
| 6,421,081 B1 | 7/2002 | Markus |
| 6,424,272 B1 | 7/2002 | Gutta et al. |
| 6,424,273 B1 | 7/2002 | Gutta et al. |
| 6,424,892 B1 | 7/2002 | Matsuoka |
| 6,428,172 B1 | 8/2002 | Hutzel et al. |
| 6,433,680 B1 | 8/2002 | Ho |
| 6,437,688 B1 | 8/2002 | Kobayashi |
| 6,438,491 B1 | 8/2002 | Farmer |
| 6,441,872 B1 | 8/2002 | Ho |
| 6,447,128 B1 | 9/2002 | Lang et al. |
| 6,452,533 B1 | 9/2002 | Yamabuchi et al. |
| 6,463,369 B2 | 10/2002 | Sadano et al. |
| 6,466,701 B1 | 10/2002 | Ejiri et al. |
| 6,472,977 B1 | 10/2002 | Pochmuller |
| 6,473,001 B1 | 10/2002 | Blum |
| 6,476,731 B1 | 11/2002 | Miki et al. |
| 6,483,429 B1 | 11/2002 | Yasui et al. |
| 6,483,438 B2 | 11/2002 | De Line et al. |
| 6,487,500 B2 | 11/2002 | Lemelson et al. |
| 6,498,620 B2 | 12/2002 | Schofield et al. |
| 6,501,387 B2 | 12/2002 | Skiver et al. |
| 6,515,581 B1 | 2/2003 | Ho |
| 6,515,597 B1 | 2/2003 | Wada et al. |
| 6,520,667 B1 | 2/2003 | Mousseau |
| 6,522,969 B2 | 2/2003 | Kannonji |
| 6,542,085 B1 | 4/2003 | Yang |
| 6,542,182 B1 | 4/2003 | Chutorash |
| 6,545,598 B1 | 4/2003 | De Villeroche |
| 6,572,233 B1 | 6/2003 | Northman et al. |
| 6,575,643 B2 | 6/2003 | Takahashi et al. |
| 6,580,373 B1 | 6/2003 | Ohashi |
| 6,581,007 B2 | 6/2003 | Hasegawa et al. |
| 6,583,730 B2 | 6/2003 | Lang et al. |
| 6,591,192 B2 | 7/2003 | Okamura et al. |
| 6,594,583 B2 | 7/2003 | Ogura et al. |
| 6,594,614 B2 | 7/2003 | Studt et al. |
| 6,611,202 B2 | 8/2003 | Schofield et al. |
| 6,611,227 B1 | 8/2003 | Nebiyeloul-Kifle |

(56) References Cited

U.S. PATENT DOCUMENTS

| | | |
|---|---|---|
| 6,611,759 B2 | 8/2003 | Brosche |
| 6,614,387 B1 | 9/2003 | Deadman |
| 6,616,764 B2 | 9/2003 | Kramer et al. |
| 6,618,672 B2 | 9/2003 | Sasaki et al. |
| 6,630,888 B2 | 10/2003 | Lang et al. |
| 6,636,258 B2 | 10/2003 | Strumolo |
| 6,642,840 B2 | 11/2003 | Lang et al. |
| 6,642,851 B2 | 11/2003 | Deline et al. |
| 6,648,477 B2 | 11/2003 | Hutzel et al. |
| 6,665,592 B2 | 12/2003 | Kodama |
| 6,670,207 B1 | 12/2003 | Roberts |
| 6,670,910 B2 | 12/2003 | Delcheccolo et al. |
| 6,674,370 B2 | 1/2004 | Rodewald et al. |
| 6,675,075 B1 | 1/2004 | Engelsberg et al. |
| 6,683,969 B1 | 1/2004 | Nishigaki et al. |
| 6,690,268 B2 | 2/2004 | Schofield et al. |
| 6,690,413 B1 | 2/2004 | Moore |
| 6,693,517 B2 | 2/2004 | McCarthy et al. |
| 6,693,518 B2 | 2/2004 | Kumata |
| 6,693,519 B2 | 2/2004 | Keirstead |
| 6,693,524 B1 | 2/2004 | Payne |
| 6,717,610 B1 | 4/2004 | Boss et al. |
| 6,727,808 B1 | 4/2004 | Uselmann et al. |
| 6,727,844 B1 | 4/2004 | Zimmerman et al. |
| 6,731,332 B1 | 5/2004 | Yasui et al. |
| 6,734,807 B2 | 5/2004 | King |
| 6,737,964 B2 | 5/2004 | Samman et al. |
| 6,738,088 B1 | 5/2004 | Uskolovsky et al. |
| 6,744,353 B2 | 6/2004 | Sjonell |
| 6,765,480 B2 | 7/2004 | Tseng |
| 6,801,127 B2 | 10/2004 | Mizusawa |
| 6,801,244 B2 | 10/2004 | Takeda et al. |
| 6,812,463 B2 | 11/2004 | Okada |
| 6,819,231 B2 | 11/2004 | Berberich et al. |
| 6,823,261 B2 | 11/2004 | Sekiguchi |
| 6,838,980 B2 | 1/2005 | Gloger et al. |
| 6,842,189 B2 | 1/2005 | Park |
| 6,846,098 B2 | 1/2005 | Bourdelais et al. |
| 6,847,487 B2 | 1/2005 | Burgner |
| 6,859,148 B2 | 2/2005 | Miller et al. |
| 6,882,287 B2 | 4/2005 | Schofield |
| 6,891,563 B2 | 5/2005 | Schofield et al. |
| 6,906,620 B2 | 6/2005 | Nakai et al. |
| 6,914,521 B2 | 7/2005 | Rothkop |
| 6,930,737 B2 | 8/2005 | Weindorf et al. |
| 6,933,837 B2 | 8/2005 | Gunderson et al. |
| 6,940,423 B2 | 9/2005 | Takagi et al. |
| 6,950,035 B2 | 9/2005 | Tanaka et al. |
| 6,959,994 B2 | 11/2005 | Fujikawa et al. |
| 6,961,661 B2 | 11/2005 | Sekiguchi |
| 6,989,736 B2 | 1/2006 | Berberich et al. |
| 6,995,687 B2 | 2/2006 | Lang et al. |
| 7,005,974 B2 | 2/2006 | McMahon et al. |
| 7,012,727 B2 | 3/2006 | Hutzel et al. |
| 7,023,331 B2 | 4/2006 | Kodama |
| 7,030,738 B2 | 4/2006 | Ishii |
| 7,030,775 B2 | 4/2006 | Sekiguchi |
| 7,046,448 B2 | 5/2006 | Burgner |
| 7,057,505 B2 | 6/2006 | Iwamoto |
| 7,085,633 B2 | 8/2006 | Nishira et al. |
| 7,095,432 B2 | 8/2006 | Nakayama et al. |
| 7,106,213 B2 | 9/2006 | White |
| 7,110,021 B2 | 9/2006 | Nobori et al. |
| 7,121,028 B2 | 10/2006 | Shoen et al. |
| 7,221,363 B2 | 5/2007 | Roberts et al. |
| 7,292,208 B1 | 11/2007 | Park et al. |
| 7,304,661 B2 | 12/2007 | Ishikura |
| 7,429,998 B2 | 9/2008 | Kawauchi et al. |
| 7,502,156 B2 | 3/2009 | Tonar et al. |
| 7,567,291 B2 | 7/2009 | Bechtel et al. |
| 7,579,939 B2 | 8/2009 | Schofield et al. |
| 7,742,864 B2 | 6/2010 | Sekiguchi |
| 7,859,565 B2 | 12/2010 | Schofield et al. |
| 8,339,526 B2 | 12/2012 | Minikey, Jr. et al. |
| 2001/0022616 A1 | 9/2001 | Rademacher et al. |
| 2001/0026316 A1 | 10/2001 | Senatore |
| 2002/0044065 A1 | 4/2002 | Quist et al. |
| 2002/0191127 A1 | 12/2002 | Roberts et al. |
| 2003/0002165 A1 | 1/2003 | Mathias et al. |
| 2003/0007261 A1 | 1/2003 | Hutzel et al. |
| 2003/0030724 A1 | 2/2003 | Okamoto |
| 2003/0052969 A1 | 3/2003 | Satoh et al. |
| 2003/0067383 A1 | 4/2003 | Yang |
| 2003/0090568 A1 | 5/2003 | Pico |
| 2003/0090569 A1 | 5/2003 | Poechmueller |
| 2003/0090570 A1 | 5/2003 | Takagi et al. |
| 2003/0098908 A1 | 5/2003 | Misaiji et al. |
| 2003/0103142 A1 | 6/2003 | Hitomi et al. |
| 2003/0122929 A1 | 7/2003 | Minaudo et al. |
| 2003/0133014 A1 | 7/2003 | Mendoza |
| 2003/0137586 A1 | 7/2003 | Lewellen |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0214576 A1 | 11/2003 | Koga |
| 2003/0214584 A1 | 11/2003 | Ross, Jr. |
| 2003/0227546 A1 | 12/2003 | Hilborn et al. |
| 2004/0004541 A1 | 1/2004 | Hong |
| 2004/0027695 A1 | 2/2004 | Lin |
| 2004/0036768 A1 | 2/2004 | Green |
| 2004/0080404 A1 | 4/2004 | White |
| 2004/0119668 A1 | 6/2004 | Homma et al. |
| 2005/0140855 A1 | 6/2005 | Utsumi |
| 2005/0237440 A1 | 10/2005 | Sugimura et al. |
| 2006/0115759 A1 | 6/2006 | Kim et al. |
| 2006/0139953 A1 | 6/2006 | Chou et al. |
| 2006/0158899 A1 | 7/2006 | Ayabe et al. |
| 2009/0015736 A1 | 1/2009 | Weller et al. |
| 2009/0096937 A1 | 4/2009 | Bauer et al. |
| 2009/0141516 A1 | 6/2009 | Wu et al. |
| 2010/0194890 A1* | 8/2010 | Weller ............... B60R 1/12 348/148 |
| 2011/0227487 A1* | 9/2011 | Nichol ............... G02B 6/0018 315/158 |
| 2013/0300728 A1* | 11/2013 | Reichow ............ G09G 3/36 345/419 |

* cited by examiner

DISPLAY MIRROR ASSEMBLY

CROSS-REFERENCE TO RELATED APPLICATION

This application claims priority to and the benefit under 35 U.S.C. §119(e) of U.S. Provisional Patent Application No. 61/788,815, filed on Mar. 15, 2013, entitled "DISPLAY MIRROR ASSEMBLY," the entire disclosure of which is incorporated herein by reference.

FIELD OF THE INVENTION

The present invention generally relates to a rearview mirror assembly, and more particularly, a display mirror assembly.

SUMMARY OF THE INVENTION

According to one aspect of the present invention, a display mirror assembly for a vehicle includes a partially reflective, partially transmissive element; and a full display module mounted behind the partially reflective, partially transmissive element, the display module having an optic block, and a display in optical communication with the optic block, the display being one of an in-place switching liquid crystal display, a fringe field switching liquid crystal display, and a vertically aligned liquid crystal display.

According to another aspect of the present invention, a display mirror assembly for a vehicle includes a partially reflective, partially transmissive element, and a full display module mounted behind the partially reflective, partially transmissive element, wherein the display mirror assembly is configured to have a steady state luminance of at least about 2000 $cd/m^2$.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION

The present illustrated embodiments reside primarily in combinations of method steps and apparatus components related to a rearview mirror assembly. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1:
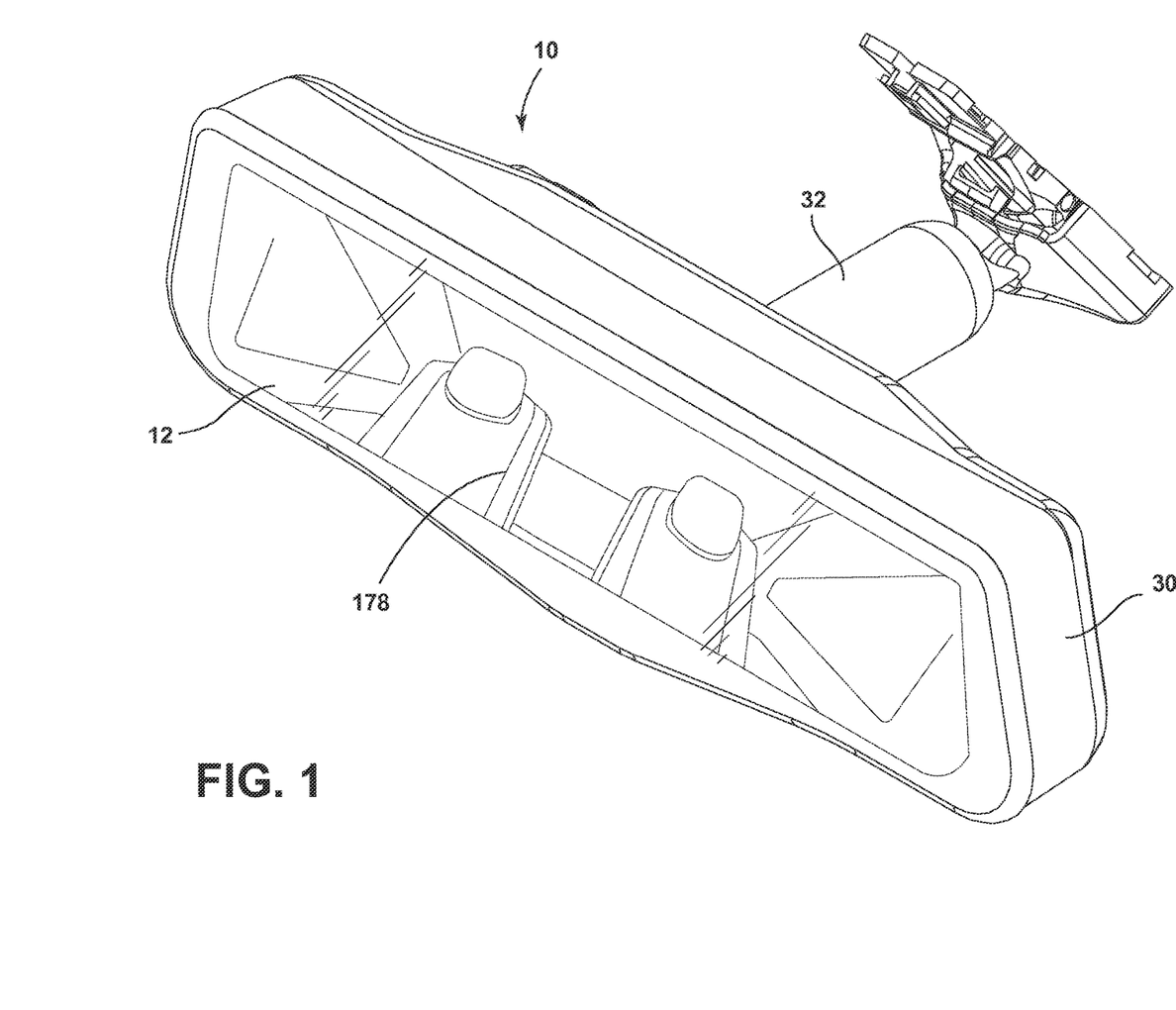
FIG. 1 is a top front perspective view of a display mirror assembly for a vehicle, in accordance with one embodiment of the present invention.
Figure 2:
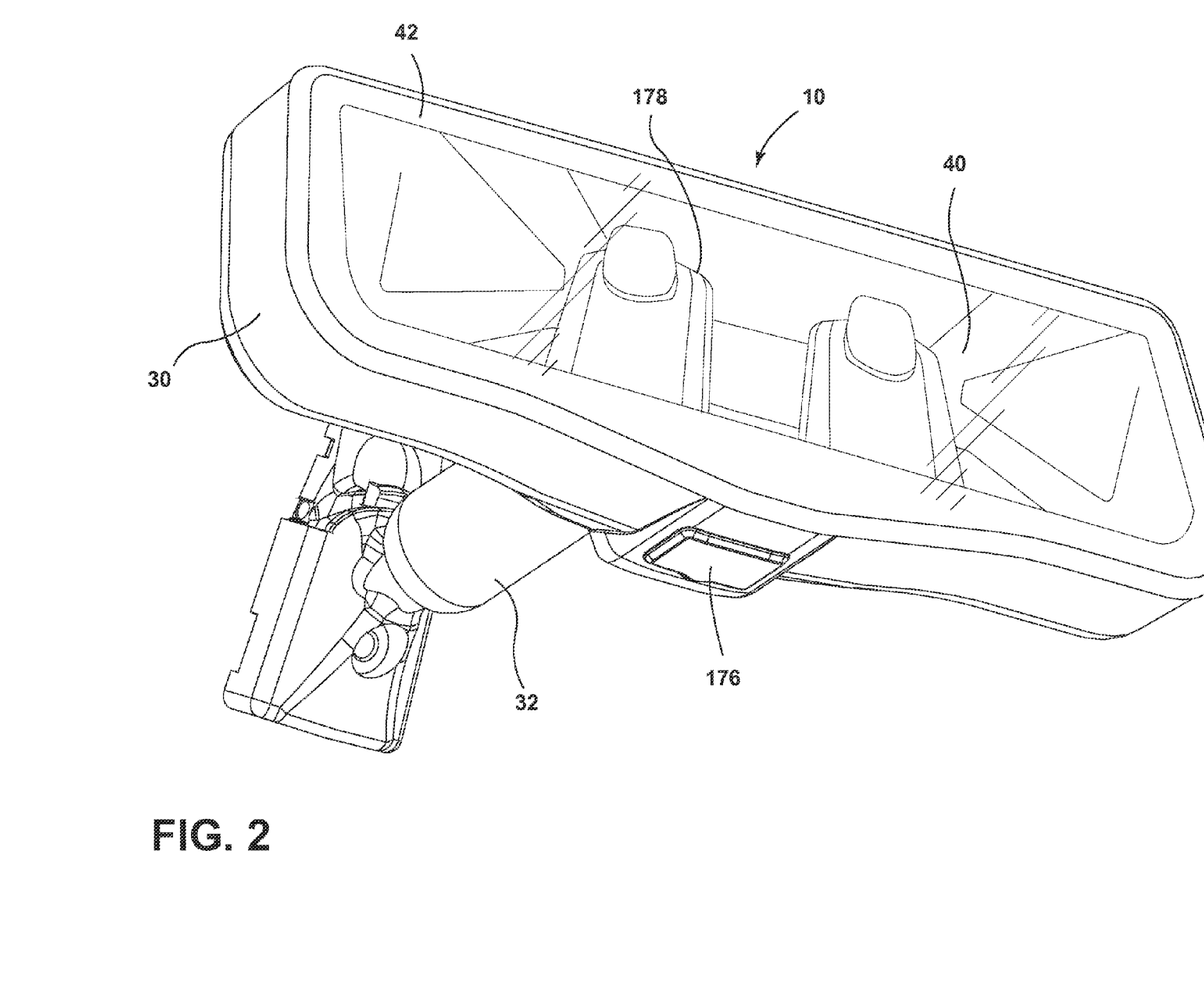
FIG. 2 is a bottom front perspective view of the display mirror assembly of FIG. 1.
Figure 3:
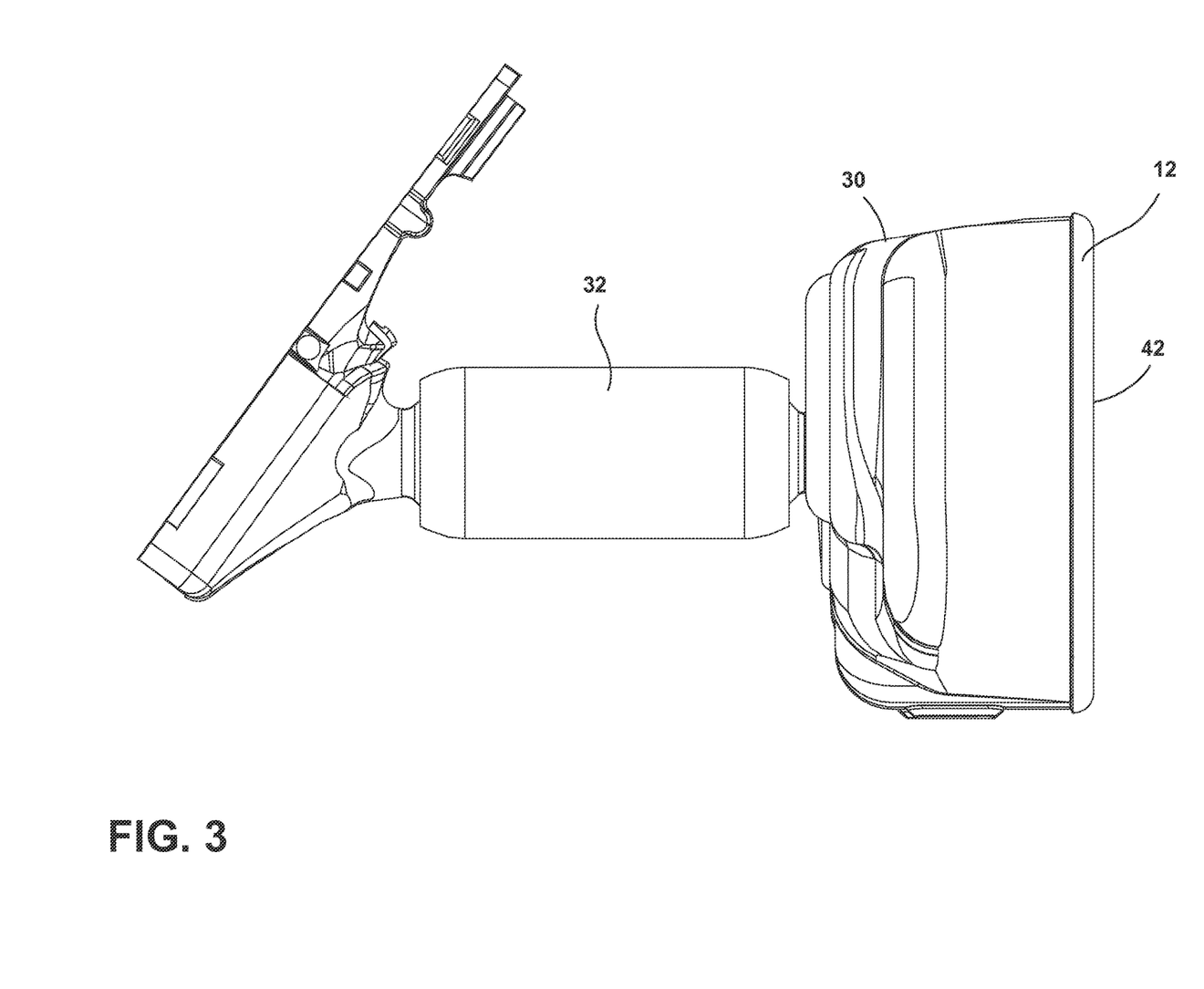
FIG. 3 is a side elevation view of the display mirror assembly of FIG. 1.
Figure 4:
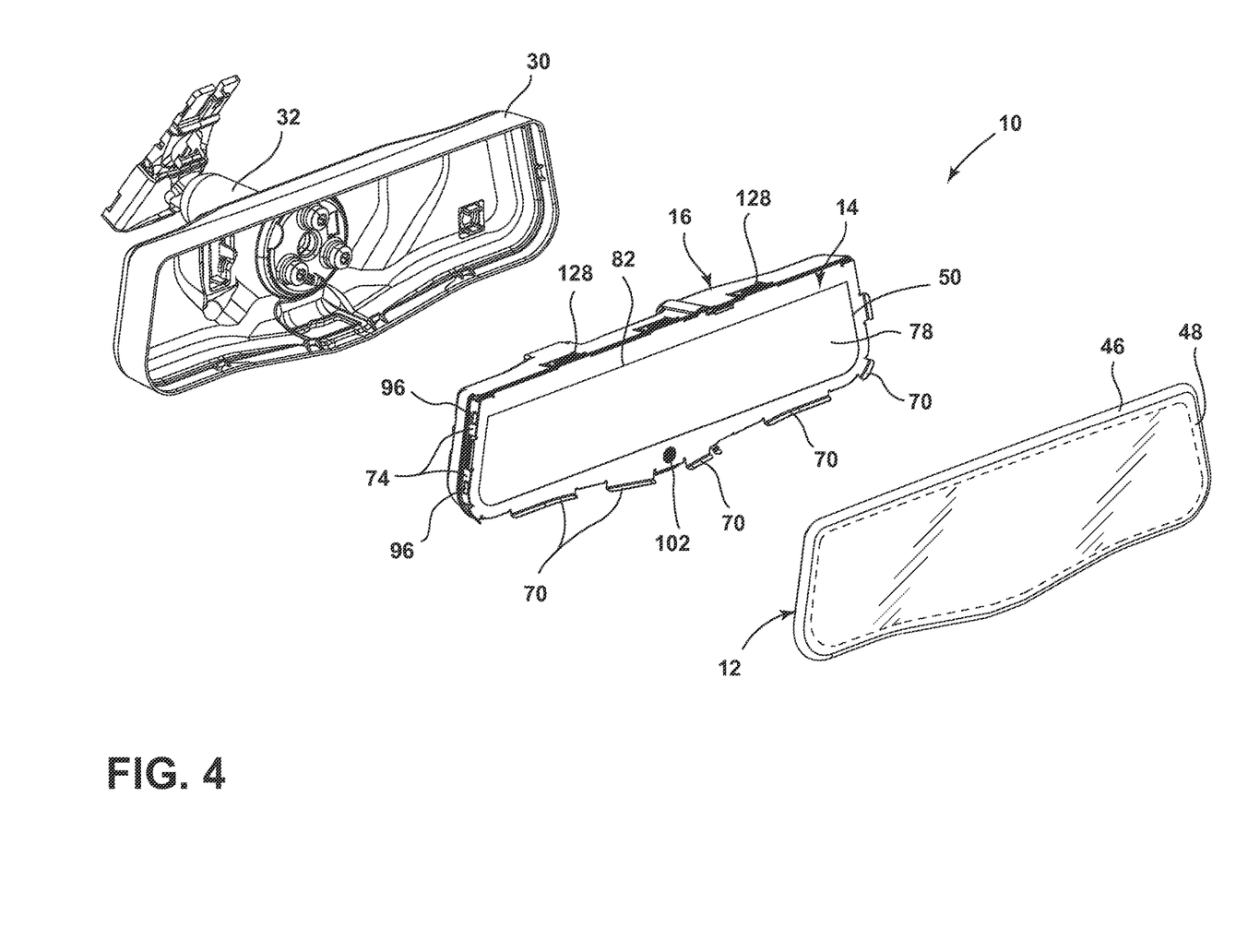
FIG. 4 is a partially exploded top perspective view of the display mirror assembly of FIG. 1.
Figure 5:
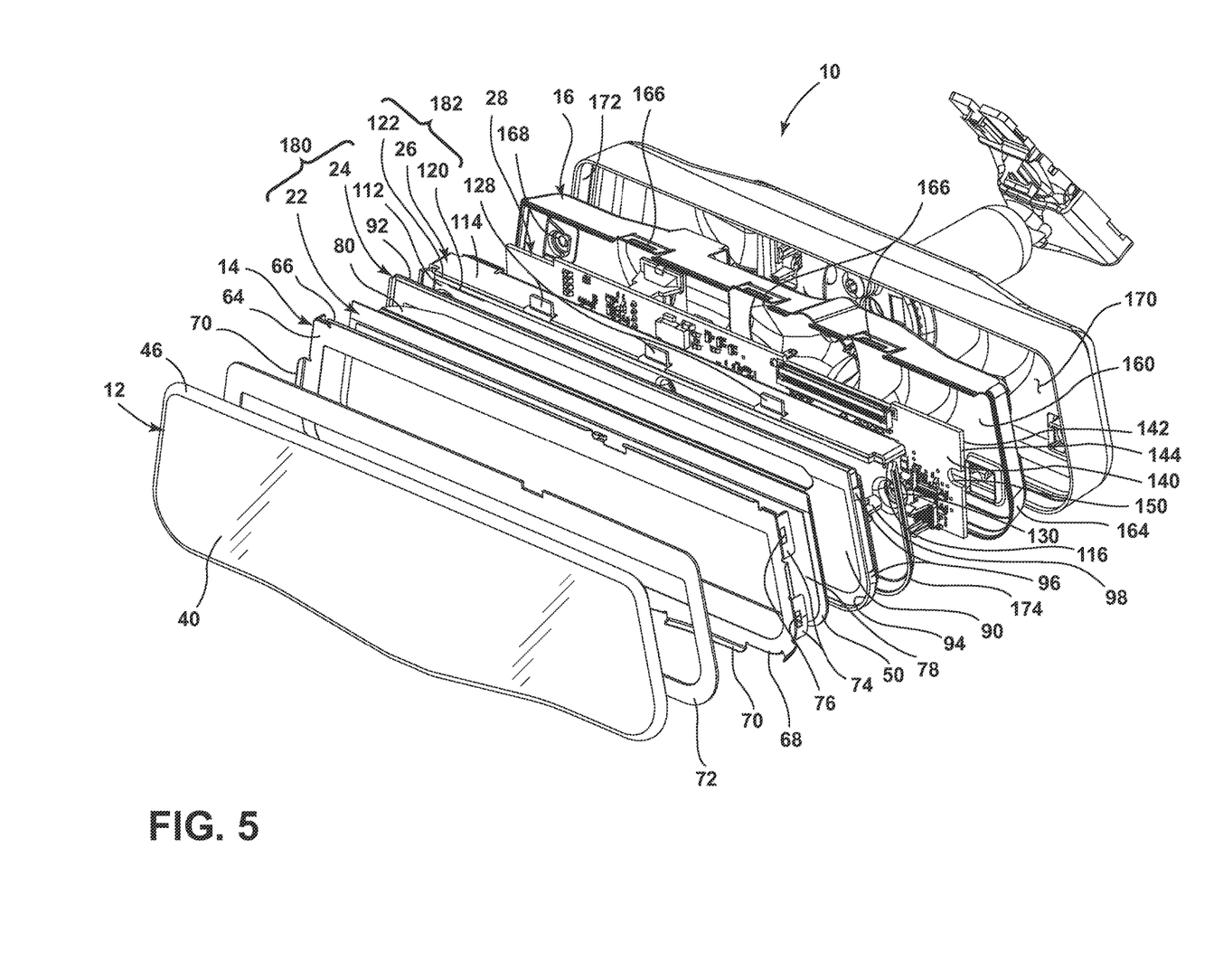
FIG. 5 is a partially exploded top perspective view of the display mirror assembly of FIG. 1.
Figure 6:
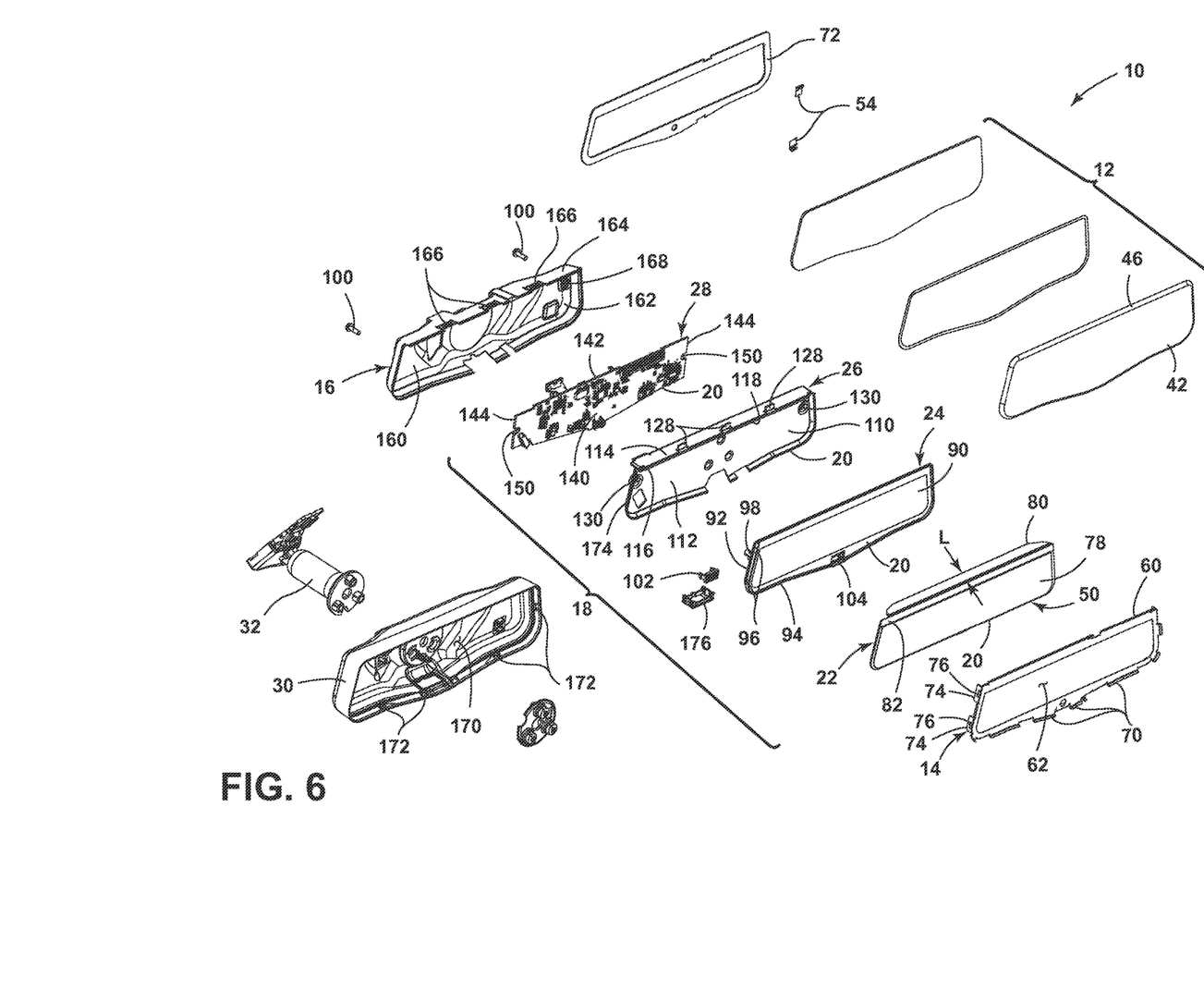
FIG. 6 is an exploded top perspective view of the display mirror assembly of FIG. 1.

Referring now to FIGS. 1-3, reference numeral 10 generally designates a display mirror assembly for a vehicle. The display mirror assembly 10 includes a partially reflective, partially transmissive element 12 (also referred to as a "glass element" herein) and a display module 18 (FIG. 6) that is viewed through the partially reflective, partially transmissive element 12. As shown in FIG. 4, the display mirror assembly 10 further includes a front shield 14 and a rear shield 16, which shield and support the partially reflective, partially transmissive element 12 and the display module 18 (FIG. 6). As shown in FIGS. 5-6, the display module 18 generally includes several components 20, including a display 22, an optic block 24, a heat sink 26, and a primary PCB 28. A housing 30 at least partially receives the front shield 14, the display module 18, and the rear shield 16, and includes a mounting member 32 extending rearwardly therefrom. The mounting member 32 is adapted for mounting on a windshield of a vehicle. Examples of a display mirror are described in U.S. Pat. No. 8,879,139, filed on Mar. 14, 2013, entitled "DISPLAY MIRROR ASSEMBLY," U.S. Provisional Patent Application Ser. No. 61/637,527 filed on Apr. 24, 2012, U.S. Provisional Patent Application Ser. No. 61/764,341 filed on Feb. 13, 2013, and U.S. patent application Ser. No. 14/180,458, entitled "SWITCHABLE REARVIEW MIRROR ELEMENT WITH ANTI-REFLECTION MECHANISMS FOR USE WITH A DISPLAY,", filed by J. VanderPloeg et al. on Feb. 14, 2014, all of which are hereby incorporated herein by reference in their entirety.

Referring generally to FIGS. 1-3, the display mirror assembly 10 has a viewing area 40, which includes a front surface 42 of the glass element 12. The viewing area 40 may be a rectangular shape, a trapezoidal shape, or any custom contoured shape desired for aesthetic reasons.

Referring to FIG. 4, the display mirror assembly 10 for a vehicle is shown, with the components partially exploded. The display mirror assembly 10 includes the glass element 12, the front shield 14 and the rear shield 16 encapsulating the display module 18, the rear housing 30, and the mounting member 32. As shown in FIGS. 4-6, the front shield 14, the rear shield 16, and components of the display module 18 include various retaining features to operably connect the several components of the display module 18 with the front shield 14, the rear shield 16 and each other, and to provide support to the display module 18. Specifically, the front shield 14 includes retaining features to operably connect the front shield 14 to the display module 18, and the rear shield 16 has retaining features to operably connect the rear shield 16 to the display module 18. The retaining features generally include snap-fit connections, tab and slot connections, screw connections, and other known retaining features. Some or all of the retaining features may also be strengthened by the addition of adhesive compounds. Certain non-limiting illustrative examples of retaining features are described in detail herein.

The display mirror assembly 10 will hereafter be described in greater detail, beginning with the elements closest to the intended viewer, and extending rearwardly away from the viewer.

As shown in FIG. 4, the glass element 12 is generally planar, with an outer perimeter 46 and a border 48 around the outer perimeter 46. The border 48 may incorporate a chrome ring or other similar finish to conceal the front shield 14 and other elements located behind the glass element 12 in the display mirror assembly 10, including without limitation a seal on an electrochromic unit, an applique, foam adhesive, or pad printing. The border 48 may extend from the outer perimeter 46 of the glass element 12 to an outer edge 50 of the display 22. Alternatively, the border 48 may be narrower and not reach from the outer perimeter 46 to the outer edge 50 of the display 22 along at least some portions of the border 48. The perimeter of the glass element 12 may also have a ground edge, a beveled edge, or be frameless.

The glass element 12 may be an electro-optic element or an element such as a prism. One non-limiting example of an electro-optic element is an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "ELECTROCHROMIC LAYER AND DEVICES COMPRISING SAME," U.S. Pat. No. 5,998,617 entitled "ELECTROCHROMIC COMPOUNDS," U.S. Pat. No. 6,020,987 entitled "ELECTROCHROMIC MEDIUM CAPABLE OF PRODUCING A PRE-SELECTED COLOR," U.S. Pat. No. 6,037,471 entitled "ELECTROCHROMIC COMPOUNDS," U.S. Pat. No. 6,141,137 entitled "ELECTROCHROMIC MEDIA FOR PRODUCING A PRE-SELECTED COLOR," U.S. Pat. No. 6,241,916 entitled "ELECTROCHROMIC SYSTEM," U.S. Pat. No. 6,193,912 entitled "NEAR INFRA-RED-ABSORBING ELECTROCHROMIC COMPOUNDS AND DEVICES COMPRISING SAME," U.S. Pat. No. 6,249,369 entitled "COUPLED ELECTROCHROMIC COMPOUNDS WITH PHOTOSTABLE DICATION OXIDATION STATES," and U.S. Pat. No. 6,137,620 entitled "ELECTROCHROMIC MEDIA WITH CONCENTRATION ENHANCED STABILITY, PROCESS FOR THE PREPARATION THEREOF AND USE IN ELECTROCHROMIC DEVICES"; U.S. Pat. No. 6,519,072 entitled "ELECTROCHROMIC DEVICE"; and International Patent Application Serial Nos. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," PCT/EP98/03862 entitled "ELECTROCHROMIC POLYMER SYSTEM," and PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," which are herein incorporated by reference in their entirety. The glass element 12 may also be any other element having partially reflective, partially transmissive properties. To provide electric current to the glass element 12, electrical elements are provided on opposing sides of the element to generate an electrical potential therebetween. A J-clip 54 is electrically engaged with each electrical element, and element wires extend from the J-clips 54 to the primary PCB 28.

Now referring to FIGS. 5-6, the front shield 14 functions to shield the display module 18 from radio frequency (RF) electromagnetic radiation and to provide support for the glass element 12 and the display module 18. The front shield 14 is formed from one or more materials which are suitable to block RF radiation including, without limitation, steel. As a non-limiting example, the front shield 14 can be formed from a stamped steel material which is about 0.2 mm thick.

Also, as shown in FIGS. 5-6, the front shield 14 is generally shaped in the form of a ring 60 having an opening 62 therethrough. The front shield 14 has a front side 64, rear side 66, and an outer surface 68, which is generally coextensive with the outer perimeter 46 of the glass element 12. The front shield 14 includes retaining features 70 extending forwardly therefrom to mechanically engage the glass element 12. An adhesive, such as a foam adhesive 72, may also be used to secure the glass element 12 to the front shield 14. The front shield 14 further includes rearwardly directed tabs 74 to operably engage the rear shield 16 (or a component of the display module 18). The rearwardly directed tabs 74 further include holes 76 therethrough, to operably engage at least one component of the display module 18, such as the optic block 24.

As best shown in FIG. 6, the display module 18 is disposed behind the front shield 14, with the display 22 viewable through the opening 62 in the front shield 14. The components of the display module 18 are ordered, from the front shield 14 toward the rear shield 16, the display 22, the optic block 24, the heat sink 26, and the primary PCB 28.

The display 22 is generally planar, with the outer edge 50 defining a front surface 78. The front surface 78 of the display 22 can be shaped to correspond to and fit within the shape of the viewing area 40 of the display mirror assembly 10. Alternatively, the display 22 may have a front surface 78 which fits within, but is not complementary to the viewing area 40, for example, where the front surface 78 of the display 22 is generally rectangular and the front surface 42 of the glass element 12 has a contoured outer perimeter 46. The distance between the outer edge 50 of the display 22 and the outer perimeter 46 of the glass element 12 is about 9 mm or less along at least a portion of the outer edge 50. In one embodiment, the display 22 has a viewable front surface 78 area which is about 56% to about 70% of the viewing area 40 of the glass element 12.

The display 22 may be LCD, LED, OLED, plasma, DLP or other display technology. The display 22 further includes a flexible electrical connector 80, which is operably mechanically and electrically connected with the primary PCB 28. The flexible electrical connector 80 has a length L which is sufficient to wrap around the display module 18 components between the display 22 and the primary PCB 28, and has a width which extends substantially along a top edge 82 of the display 22. The flexible electrical connector 80, when operatively connected to the primary PCB 28, aids in securing the components along a top edge of the display module 18.

As shown in FIGS. 5-6, the optic block 24 includes a front side 90 which is facing the display 22, a rear side 92 which is facing the heat sink 26, and an outer perimeter 94. The optic block 24 further includes tabs 96 extending generally outwardly therefrom around at least a portion of the outer perimeter 94. The tabs 96 are received through the holes 76 in the rearwardly directed tabs 74 of the front shield 14 to operably mechanically engage the optic block 24 with the front shield 14. The optic block 24 further includes at least one screw-receiving element 98 on the rear side 92 thereof. The screw-receiving element 98 is adapted to engage a screw 100 threaded through the rear shield 16 and the display module 18 components between the optic block 24 and the rear shield 16. In alternate embodiments, the tabs 96 for engaging the front shield 14, the screw-receiving elements 98, or both, could be provided on different components of the display module 18.

As shown in FIGS. 4 and 6, a glare sensor 102 is provided on the front side 90 of the optic block 24, in a location which receives light through the glass element 12, and which is not behind the display 22. The glare sensor 102 is snap-fit into a receiving aperture 104 in the optic block 24. The glare sensor 102 receives light from headlamps of a trailing vehicle, and measures information regarding the likely glare visible on the glass element 12 and communicates this information to the display mirror assembly 10 so that the display mirror assembly 10 can be optimized to allow viewing of the display 22 through the glass element 12. The optical vertical/horizontal pattern of glare sensor 102 is symmetrical so that orientation of the glare sensor 102 is not significant. The glare sensor 102 could also be packaged at least partially within the housing 30 of the display mirror assembly 10 and have a light guide which is configured to propagate light to the glare sensor 102. The glare sensor 102 could also be an imager on a rear portion of the vehicle, wherein a signal representative of the received light is communicated from the glare sensor 102 to the display mirror assembly 10.

As shown in FIGS. 5-6, the heat sink 26 is disposed rearwardly from the optic block 24, and dissipates heat generated by the primary PCB 28 and other components of the display module 18. The heat sink 26 has a generally planar body 110 with a front side 112 and a top edge 114. A channel 116 extends along the top edge 114 of the heat sink 26, and defines a forward-facing opening 118. An edge lit PCB 120 and a gap filler 122 are disposed partially within the channel 116, with the edge lit PCB 120 extending generally perpendicularly from the heat sink 26 in a forward direction, and having an operable side which is facing downward, away from the top edge 114. The edge lit PCB 120 includes a wiring adapted for electrical connection with the primary PCB 28 to permit electrical power and signals to be supplied to the edge lit PCB 120. A plurality of tabs 128 extend upwardly from the top edge 114 of the heat sink 26, for mechanical engagement with the rear shield 16.

The heat sink 26 also includes at least one hole 130 therethrough to receive a screw 100 threaded from the rear shield 16 to the optic block 24. The screw-receiving element 98 of the optic block 24 is optionally raised to extend through the hole 130 in the heat sink 26 and receive the screw 100. The screw-receiving element 98 of the optic block 24 may also aid in alignment of display module 18 components during manufacturing and will provide additional reinforcement to the display module 18 in the interaction between components if it is raised.

The primary PCB 28 operates to provide electrical power and control for the components of the display module 18 and for the glass element 12. As shown in FIGS. 5-6, the primary PCB 28 is generally planar, with a front side 140, a rear side 142, and side edges 144. The front side 140 is facing the heat sink 26 and the rear side 142 is facing the rear shield 16. Electrical components are generally oriented on the rear side 142 of the primary PCB 28. The primary PCB 28 includes an electrical connector for operable electrical engagement with the electrical element wires of the glass element 12, an electrical connector for operable electrical engagement with the flexible electrical connector 80, and an electrical connector for operable electrical engagement with the wiring harness. Additional functional elements that may be provided on the display mirror assembly 10 may also be electrically connected to the primary PCB 28, such as the glare sensor 102 and any other functional buttons or features of the display mirror assembly 10. The primary PCB 28 further includes side cutouts 150 along the side edges 144 to permit passage of the screws 100 used to secure the rear shield 16 to the components of the display module 18.

The rear shield 16 functions to shield the display module 18 from RF radiation. As best shown in FIGS. 4-5, the rear shield 16 also serves to encapsulate the display module 18, and further interlock the components of the display mirror assembly 10. The rear shield 16 is formed from a material which is suitable to block such radiation and provide the desired support for the display mirror assembly 10, such as steel. As a non-limiting example, the rear shield 16 can be formed from stamped steel with a thickness of about 0.381 mm.

As shown in FIG. 6, the rear shield 16 includes a rear wall 160 having an outer perimeter 162, and a peripheral wall 164 extending forwardly from the rear wall 160 about at least a portion of the outer perimeter 162. The peripheral wall 164 has slots 166 therein, which correspond to the upstanding tabs 128 along the top edge 114 of the heat sink 26 and are operably mechanically engageable therewith. The rear shield 16 further includes at least one hole 168 therethrough to accommodate the screw 100, where the screw 100 extends through the rear shield 16 and into the components of the display module 18 to secure the rear shield 16 to the display module 18. The screw 100 extends through the rear wall 160 of the rear shield 16, through the side cutouts 150 of the primary PCB 28, through the heat sink 26, and is secured to the screw-receiving element 98 on the rear side 92 of the optic block 24.

The rear housing 30 includes a forwardly directed cavity 170, into which all or a portion of the front shield 14, rear shield 16, and the display module 18 supported therebetween are inserted. The rear housing 30 includes mechanically engaging features 172 which snap fit with corresponding engagement features 174 located on the peripheral wall 164 of the rear housing 30 or on a display module 18 component such as the heat sink 26. The mounting member 32 is operably engaged with the rear housing 30 in any known manner.

With respect to the following description, the display mirror assembly 10 is considered "on axis" when a line perpendicular to the plane of the glass element 12 extends toward the eyes of a viewer. Due to the display 22 being viewed through the glass element 12, any glare on the glass element 12 may interfere with the visibility of the display 22. When the display mirror assembly 10 is on axis and is being used during night time driving conditions, headlights from a trailing vehicle (i.e., a vehicle driving behind the vehicle with the display mirror assembly 10) can cause a glare which is visible to the driver. According to one embodiment of the present invention, an actuator device 176, as shown in FIGS. 2 and 6, is operably coupled to the display mirror assembly 10. When actuated, the actuator device 176 moves at least the glass element 12 off axis (i.e., away from a direct line toward the driver's eyes). Typically, actuation of the actuator device 176 tilts the glass element 12 upwards to move the mirror to an off-axis position. However, it should be appreciated that the actuator device 176 can be configured to move the mirror in any direction with respect to the axis. The actuator device 176 can also be configured to move the display 22 upon activation. The actuator device 176 can also be configured to turn the display 22 on or off. Thus, when the actuator device 176 is actuated to move the mirror off axis, the display 22 can be turned off.

Additionally, to provide information to the viewer of the display mirror assembly 10, the display mirror assembly 10 may include information regarding the field of view 178, such as a partially transmissive graphic overlay or an image on the display 22 visible on the viewing area 40 when the display mirror assembly 10 is in use.

In order to construct the display mirror assembly 10 described herein, the J-clips 54 are installed on the glass element 12, and then element wires are soldered to the top portion of the J-clips 54. The glass element 12 is then secured to the front side 64 of the front shield 14, using the foam adhesive 72 and the forward-retaining features 70 of the front shield 14. The front shield 14 is then inverted, with the glass element 12 facing downwardly on a protective surface.

A first subassembly 180 (FIG. 5), including the display 22 and optic block 24, is assembled by snap-fitting the glare sensor 102 into the receiving aperture 104 in the optic block 24, and adhering the display 22 to the optic block 24. The adhesion of the display 22 and optic block 24 may include coating the front side 90 of the optic block 24 with an adhesive and applying a release liner over the adhesive, wherein the release liner is easily removable from the adhesive. When it is time to assemble the display 22 and optic block 24, the release liner is removed, and the display 22 is positioned on the front side 112 of the optic block 24. To position the display 22, one edge of the display 22 is aligned in the appropriate location on the optic block 24, and then the display 22 is rotated into contact with the front side 90 of the optic block 24. The first subassembly 180 is placed in position on the rear side 66 of the front shield 14. The tabs 96 extending outwardly from the optic block 24 are inserted through the holes 76 in the rearwardly directed tabs 74 of the front shield 14.

A second subassembly 182 (FIG. 5), including the heat sink 26 and edge lit PCB 120, is assembled. To assemble the second subassembly 182, the gap filler 122 is adhered to the edge lit PCB 120. The adhesion may include coating one side of the gap filler 122 with adhesive and then applying the gap filler 122 to the edge lit PCB 120 so that it does not interfere with the operable side of the edge lit PCB 120. The gap filler 122 and edge lit PCB 120 are then inserted into the opening in the channel 116 on the front side 112 of the heat sink 26. Locating features are optionally provided on the heat sink 26, the edge lit PCB 120 or both, to aid in inserting the side lit PCB and gap filler 122 into the channel 116. The second subassembly 182 is placed in position on the rear side 92 of the optic block 24. The screw-receiving elements 98 extending rearwardly from the optic block 24 extend through the holes 130 in the heat sink 26.

The primary PCB 28 is placed above the top edge of the second subassembly 182, with the front side 140 facing upwards. The flexible electrical connector 80 from the display 22 is mated with the electrical connector therefor. The primary PCB 28 is then rotated 180 degrees about the top edge of the second subassembly 182, so that the front side 140 is in contact with the heat sink 26. When rotating the primary PCB 28, the flexible electric connector 80 is wrapped over the top edge of at least a portion of the display module 18. The element wires are electrically connected with the electrical connectors 80 therefor, and the wiring harness for the edge lit PCB 120 is connected with the electrical connector 80 therefor.

As shown in FIGS. 4-5, the rear shield 16 is placed over the primary PCB 28, and the tabs 128 extending upwardly from the heat sink 26 are engaged with the slots 166 on the peripheral wall 164 of the rear shield 16. At least one screw 100 is inserted through the screw holes 168 in the rear shield 16, through the side cutouts 150 in the PCB 120, through the heat sink 26, and into the screw-receiving elements 98 on the optic block 24. It is desirable that two to three screws 100 are affixed in this manner.

The forwardly directed cavity 170 of the rear housing 30 is placed over the rear shield 16, and the mechanically engaging features 172 of the rear housing 30 are snap fit to engage with the corresponding engagement feature 174 of the heat sink 26. The mounting member 32 may be installed in the rear housing 30 prior to assembly.

The present invention may be used with a mounting system such as that described in U.S. Pat. Nos. 8,201,800; and 8,210,695; U.S. patent application Ser. No. 13/600,496; U.S. Patent Application Publication Nos. 2012/0327234 A1; 2013/0062497 A1; and 2012/0218655 A1; and U.S. Provisional Patent Application Nos. 61/709,716; 61/707,676; and 61/704,869, which are hereby incorporated herein by reference in their entirety. Further, the present invention may be used with a rearview packaging assembly such as that described in U.S. Pat. Nos. 8,264,761; 8,646,924; and 8,643,931; U.S. Patent Application Publication Nos. 2013/01945650 A1; and 2012/0218655 A1; and U.S. Provisional Patent Application Nos. 61/707,625; and 61/590,259, which are hereby incorporated herein by reference in their entirety. Additionally, it is contemplated that the present invention can include a bezel such as that described in U.S. Pat. Nos. 8,201,800; and 8,210,695; and U.S. Patent Application Publication No. 2012/0268961 A1, which are hereby incorporated herein by reference in their entirety.

A display mirror assembly according to the present disclosure has several advantages. The display module is supported by the front shield and rear shield, and does not require a separate support or carrier plate. Omission of a carrier plate, and inclusion of retaining features in the front shield and rear shield, permits the display mirror assembly to be lighter, involve fewer parts for manufacturing, and to have a display which is viewable over a larger percentage of the total viewing area of the display mirror assembly.

A design approach used herein for selecting an appropriate display 22 first focuses on a resolution for the display 22 such that individual pixels are not visible at a typical target viewing distance. A typical viewing distance for a vehicle display mirror 10 is about 500 mm, as described below. Thus, if alternating black and white lines are shown on the display 22, an average viewer should preferably not be able to distinguish the lines at the target viewing distance.

Visual acuity of a person with about 20/20 vision can be considered to be about one arcmin or about $\frac{1}{60}^{th}$ of a degree. Visual acuity is typically evaluated by displaying a horizontal grating of alternating black and white lines on an electronic display at a given distance. A person with about 20/20 vision is typically able to see up to about 60 features or about 30 black/white alternating line pairs within a visual angle of one degree. The line density or pixel density expressed as pixels-per-inch (PPI) can be a design parameter.

In a rearview mirror assembly application, the distance between the eyes of a vehicle occupant (e.g., a driver) and an approximate center of the display can be the distance of view. For purposes of explanation and not limitation, in such an embodiment, the distance of view can be between approximately 400 mm and 1000 mm depending upon several factors, including, but not limited to, an interior design of the vehicle. The PPI can be based on a distance of view of less than approximately 600 mm or less than approximately 500 mm.

According to one embodiment, wherein the distance of view is approximately 500 mm, the PPI can be about 175 PPI or a pixel pitch of 0.1454 mm.

The display module 18 can include various types of displays 22, including, but not limited to a liquid crystal display (LCD). Various types of LCDs can be used, including, but not limited to, twisted nematic (TN), in-plane switching (IPS), fringe field switching (FFS), vertically aligned (VA), etc. Different display technologies typically have different operating characteristics, such as, but not limited to, percentage of backlight transmission and contrast over angle.

By way of explanation and not limitation, in operation, the display mirror assembly 10 can be used as a full display mirror in a vehicle to be operational substantially continuously while driving, as opposed to back-up display systems that are used only during certain times of vehicle operation (i.e., when the vehicle is in reverse gear). Mirror-borne back-up monitors that use light emitting diode (LED) backlights for an LCD typically exhibit higher "start-up" luminance compared to "steady state" luminance, which can be because the efficiency of the LED backlights can be reduced over time as a function of heat. The display mirror assembly 10, being a full mirror display system, should be substantially brighter than a back-up monitor display so that the steady state luminance of the display mirror assembly 10 can be approximately equal to a start-up luminance of the back-up monitor system. Thus, the display mirror assembly 10 can be configured to have a steady state luminance of about 1500 cd/m$^2$, preferably 2000 cd/m$^2$ at room temperature, according to one embodiment. In such an embodiment, the display mirror assembly 10 has an increase in steady state luminance of approximately 50% over prior art mirror-borne back-up monitor steady state performance.

The display module 18 can be configured to have an acceptable luminance transmission percentage for the target luminance. Luminance transmission is a function of aperture ratio. As the pixel density increases, the aperture ratio decreases because the thin film transistor (TFT) and associated drive connections at each pixel are approximately the same size regardless of resolution. Thus, there is a design tradeoff between luminance and resolution.

For a target luminance of at least 2000 cd/m$^2$ from a display mirror assembly 10 including an electrochromic element 12 having a transmission of about 40%, the display 22 would have a video display output of at least 5000 cd/m$^2$. For a pitch of less than about 0.15 mm, a twisted nematic (TN) LCD would have a transmission of about 3%. Therefore, an LED backlight having a steady state output of at least about 166,667 cd/m$^2$ would be required to achieve a target steady state luminance of about 2000 cd/m$^2$ from a display mirror assembly 10. By comparison, an FFS LCD of the same pixel pitch would have a transmission of about 6% and require an LED backlight having a steady state output of at least about 83,333 cd/m$^2$ to achieve a target steady state luminance of 2000 cd/m$^2$. The difference in aperature ratio between the FFS LCD and the TN LCD, as is commonly understood, can result from the clear pixel electrode of the FFS in comparison to the opaque pixel electrode of the TN LCD. Additionally, the TN LCD may require a storage capacitor at each pixel which can further reduce the aperture ratio compared to the FFS LCD.

Generally, the TN LCD is a lower cost technology compared to the FFS LCD, when considering an LCD of equal size and complexity. However, in the full display mirror assembly 10, the added cost of the brighter LED backlight outweighs any cost advantage the TN LCD might have. Thus, to obtain a video display output of at least 5000 cd/m$^2$, a display 22 should be selected that has at least 5% transmission, preferably at least 6% transmission. Display 22 may be constructed using an FFS LCD, which has a transmission of 6%.

According to one embodiment, the display 22 can have a resolution of about 1280×240, a pixel pitch of less than about 0.15 mm, and be an IPS, FFS, or VA type LCD. IPS, FFS, and VA type LCDs are also advantageous over TN LCDs in that they have a wider viewing angle, which is significant for a display mirror assembly 10, where the angle of view from the driver's eye position to the outermost edge of the display 22 could be as much as 30 degrees.

Figure 7A:
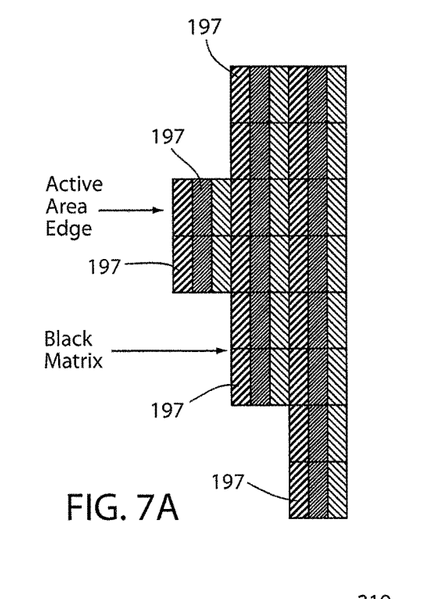
FIG. 7A is a diagram illustrating pixel layout of a display, in accordance with one embodiment of the present invention.
Figure 7B:
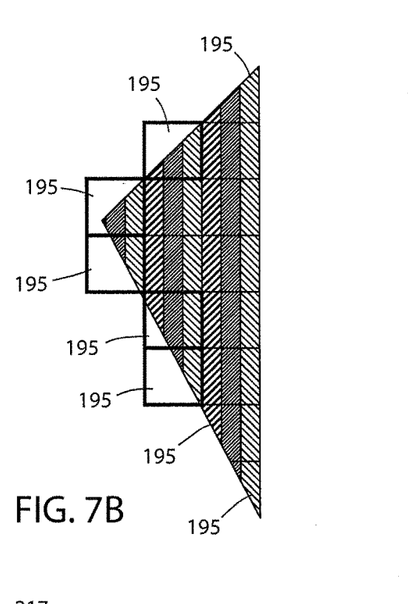
FIG. 7B is a diagram illustrating pixel layout of a display, in accordance with one embodiment of the present invention.

As exemplary illustrated in FIG. 1, the display 22 can have a trapezoidal shape. However, it should be appreciated by those skilled in the art that the display 22 can have other shapes, such as, but not limited to, square, rectangular, symmetrical, non-symmetrical, or contoured. In regards to FIGS. 7A and 7B, the pixel layout can affect performance in an embodiment have a non-rectangular display. Edge pixels 195 with a slant (FIG. 7B) can have inconsistent color due to primary mixing, which can have a reduced performance as compared to edge pixels 197 that do not slant (FIG. 7A). Additionally or alternatively, a small pixel pitch and/or masking with a film or metal layer can result in de-emphasizing a jagged edge.

Figure 8:
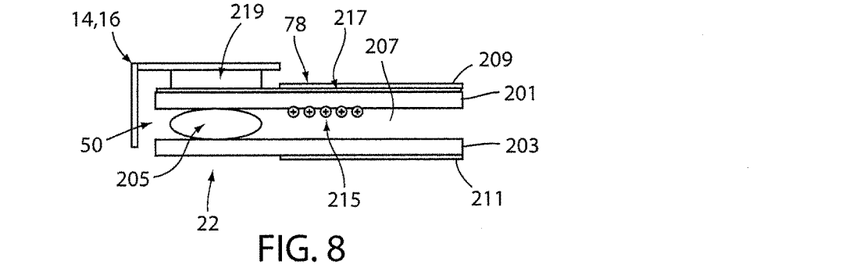
FIG. 8 is a diagram of a display mirror assembly, in accordance with one embodiment of the present invention.

One problem associated with an IPS or FFS type LCDs, is that a charge build-up in the IPS or FFS type LCD can cause discoloration over time. FIG. 8 shows a partial crosssectional view of an end portion of an LCD element 22 according to an embodiment of the invention. As shown, LCD element 22 includes a pair of glass substrates 201 and 203 sealed together in spaced relation with a seal 205 near edge 50 to define a chamber in which a liquid crystal material 207 is provided. Polarizers 209 and 211 are provided on the outer surfaces of substrates 201 and 203. As indicated by reference numeral 215, a charge build-up may form on an interior surface of one of the substrates (such as substrate 201). To reduce this charge build-up 215, electrically conductive layer 217 such as a layer of indium tin oxide (ITO) may be provided on an outer surface of the substrate 201 on which the charge builds up near front surface 78 of display element 22. Electrically conductive layer 217 may be electrically connected to ground via an electrically conductive connection. The electrically conductive connection can have a resistance of approximately 10 to 20 ohms. Examples of the electrically conductive connections are, but are not limited to, conductive foam, tape, FPC direct connection, the like, or a combination thereof. In the example shown in FIG. 8, an electrically conductive foam pad 219 coupled to one of the metal shields 14 or 16 serves as the electrically conductive connection.

Figure 9A:
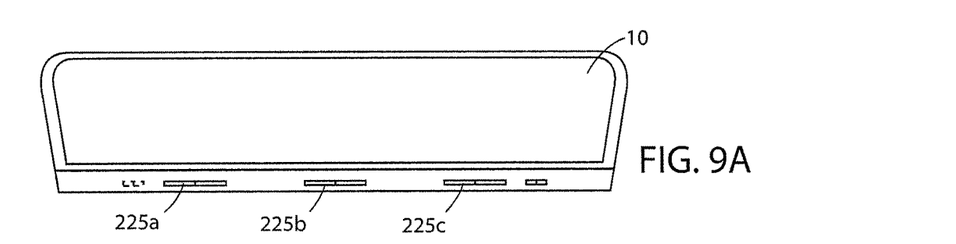
FIG. 9A is a diagram of a display mirror assembly, in accordance with one embodiment of the present invention.
Figure 9B:
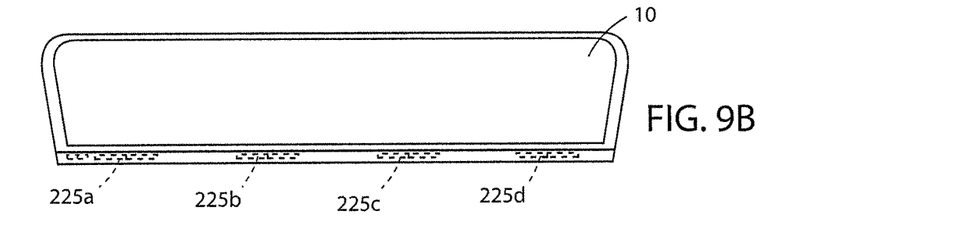
FIG. 9B is a diagram of a display mirror assembly, in accordance with one embodiment of the present invention.

The display mirror assembly 10 can include three source drivers 225a, 225b, and 225c as illustrated in FIG. 9A. Alternatively, display mirror assembly 10 can include four source drivers 225a, 225b, 225c, and 225d as illustrated in FIG. 9B. The embodiment of FIG. 9B can have a reduced chip ledge as compared to the embodiment illustrated in FIG. 9A. The chip ledge can be reduced by about 3 mm in FIG. 9B compared to FIG. 9A.

According to one embodiment, a TFT (thin film transistor) at approximately each pixel of the display 22 can have a semiconductor material, such as, but not limited to, amorphous silicon, low temperature polysilicon (LIPS), or metal oxide (such as indium-gallium-oxide). Generally, the amorphous silicon TFT is the lowest cost TFT technology, but amorphous silicon TFT can be more sensitive to high intensity backlights (>100,000 cd/m$^2$), due to leakage currents, resulting in loss of contrast. Typically, the LIPS TFT can be used when, but not limited to, the display module 18 has a series of circuits built into glass, the display module 18 is a contoured shape, or a combination thereof. Additionally or alternatively, the LIPS can increase luminance transmission because the increased electron mobility of LIPS allows for a smaller TFT at each pixel. Additionally or alternatively, an LIPS TFT can be less sensitive to high intensity backlights because its smaller size makes it easier to shield with opaque metal layers.

It will be appreciated that embodiments of the invention described herein may be comprised of one or more conventional processors and unique stored program instructions that control one or more processors to implement, in conjunction with certain non-processor circuits, some, most, or all of the functions of a display mirror assembly 10, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A display mirror assembly for a vehicle, comprising:
   a partially reflective, partially transmissive element; and
   a full display module mounted behind said partially reflective, partially transmissive element, said display module comprising:

an optic block; and
a display in optical communication with said optic block, said display being one of an in-place switching liquid crystal display, a fringe field switching liquid crystal display, and a vertically aligned liquid crystal display, wherein said display comprises:
a substrate;
an electrically conductive layer provided on an outside surface of said substrate; and
an electrically conductive connection to electrically connect said electrically conductive layer to ground to reduce a charge build-up in said display.

2. The display mirror assembly of claim 1, configured for use when the distance of view is less than about 600 mm.

3. The display mirror assembly of claim 1, configured for use when the distance of view is less than about 500 mm.

4. The display mirror assembly of claim 1, wherein said full display module has a pixel pitch of less than about 0.15 mm.

5. The display mirror assembly of claim 1, further comprising one of three and four source drivers.

6. The display mirror assembly of claim 1, wherein said display comprises thin film transistors for each pixels of said display, wherein said thin film transistors comprise low temperature polysilicon.

7. The display mirror assembly of claim 1, configured for use in a vehicle as an interior rearview mirror assembly.

8. The display mirror assembly of claim 1, wherein said full display module is configured to be on substantially continuously while a vehicle is in operation.

9. A display mirror assembly for a vehicle, comprising:
a partially reflective, partially transmissive element; and
a full display module mounted behind said partially reflective, partially transmissive element;
wherein the display mirror assembly is configured to have a steady state luminance of at least about 2000 cd/m$^2$,
wherein said display comprises:
a substrate;
an electrically conductive layer provided on an outside surface of said substrate; and
an electrically conductive connection to electrically connect said electrically conductive layer to ground to reduce a charge build-up in said display.

10. The display mirror assembly of claim 9, configured for use when the distance of view is less than about 600 mm.

11. The display mirror assembly of claim 9, configured for use when the distance of view is less than about 500 mm.

12. The display mirror assembly of claim 9, wherein said full display module has a pixel pitch of less than about 0.15 mm.

13. The display mirror assembly of claim 9, configured for use in a vehicle as an interior rearview mirror assembly.

14. The display mirror assembly of claim 9, wherein said full display module is configured to be on substantially continuously while a vehicle is in operation.

15. A display mirror assembly for a vehicle, comprising:
a partially reflective, partially transmissive element; and
a full display module mounted behind said partially reflective, partially transmissive element, said full display module comprising a display;
wherein said display is a fringe field switching liquid crystal display having a pixel pitch of less than about 0.15 mm;
wherein the display mirror assembly is configured to have a steady state luminance of at least about 2000 cd/m$^2$ when the distance of view is about 500 mm,
wherein said display comprises:
as substrate;
an electrically conductive layer provided on an outside surface of said substrate; and
an electrically conductive connection to electrically connect said electrically conductive layer to ground to reduce a charge build-up in said display.

16. The display mirror assembly of claim 15, wherein said partially reflective, partially transmissive element is an electrochromic element.

17. The display mirror assembly of claim 15, wherein said full display module is configured to be on substantially continuously while a vehicle is in operation.

* * * * *